United States Patent [19]

Rubel

[11] 4,233,204

[45] Nov. 11, 1980

[54] AMINE-PROMOTED, PEROXIDE-CURED POLYESTER COMPOSITION

[75] Inventor: Peter A. Rubel, Concord, Mass.

[73] Assignee: Rule Industries, Gloucester, Mass.

[21] Appl. No.: 5,400

[22] Filed: Jan. 22, 1979

[51] Int. Cl.³ .......................... C08K 3/22; C08K 9/04
[52] U.S. Cl. .................................. 260/40 R; 525/15;
525/25; 252/430
[58] Field of Search .............. 260/40 R, 864; 525/15, 525/25

[56] References Cited

U.S. PATENT DOCUMENTS

| | | | |
|---|---|---|---|
| 3,297,789 | 1/1967 | Fekete | 260/864 |
| 3,560,253 | 2/1971 | Ashton | 260/865 X |
| 3,677,999 | 7/1972 | Denk et al. | 260/40 R X |
| 3,714,113 | 1/1973 | Kingston | 260/40 R |
| 3,914,200 | 10/1975 | Oswitch et al. | 260/864 X |
| 4,159,977 | 7/1979 | Hsieh | 525/15 |

Primary Examiner—Sandra M. Person
Attorney, Agent, or Firm—Cesari & McKenna

[57] ABSTRACT

A novel amine-promoted, peroxide-cured polyester composition which can be utilized at low temperatures, e.g. 25° to 50° F., but which will not react at an excessively rapid rate should the amine be added to the curing agent before the curing agent is mixed with the polyester. The preferred system comprises, in addition to the polyester resin and peroxide curing agent, (a) an organoalkanolamine and (b) a hydrated inorganic filler on which the amine is distributed.

18 Claims, No Drawings

AMINE-PROMOTED, PEROXIDE-CURED POLYESTER COMPOSITION

BACKGROUND OF THE INVENTION

This invention relates to curable resin systems and, in particular, to polyester resin systems which are suitable for use as laminating resins and, for example, in use with reinforcing webs, such as fiberglass, for the repair of boat hulls, automobile fenders or the like.

Polyester resin systems are already used to patch and repair numerous articles. In general, such systems will be two-component systems. A curable resin will be the primary ingredient of one component. The other component will comprise a so-called curing agent which will, on mixing with the first component, react with the resin to cause a chemical reaction whereby the resin is converted from a pliable mass to a hard solid having structural integrity.

In the past, peroxide-cured systems have generally required temperatures of about 60° F. or higher to cure in an acceptable time. The practicality of using such systems diminishes rapidly as the temperature drops below 60° F. From a practical point of view, this means that one often required a heated garage or the like to repair automobiles and boats with prior art resin systems.

There are available curing systems that would be effective at lower temperatures. For example, some amines can be added as promoters to the resin to lower the curing temperature of the systems. However, these amine-promoted systems must be handled with extreme care. If, for example, the amine promoter is mistakenly added to the peroxide curing agent before adding the mixture to the resin, a severe exotherm can result. For this reason, many consider that amine-promoted systems are not generally suitable for use by the general public.

Consequently, there has remained a need for a safe polyester curing system which can be used at low temperatures.

SUMMARY OF THE INVENTION

It is a principal object of the invention to provide a novel process for curing polyester resin and a novel cure-promoting composition useful in carrying out such a process.

It is a further object of the invention to provide a polyester resin system which may be suitably and rapidly cured at temperatures as low as about 25° F.

Still another object of the invention is to provide means to protect an amine-promoted peroxide curing system against excessively rapid reaction rates should the amine promoter be mixed with the curing agent before the curing agent is mixed into the resin.

Another object of the invention is to provide means to cure polyester resin systems at about 32° F. within 24 hours utilizing an amine-promoted peroxide curing system.

Other objects of the invention will be obvious to those skilled in the art on their reading of this disclosure.

In the preferred embodiment of the invention, an amine promoter is absorbed onto the surface of a quantity of a hydrated filler. A quantity of from 2 to 15% by weight of th promoter on alumina trihydrate having a mean particle size of 6.5 to 9.5 microns is sufficient and suitable for practice of the invention. Quantities of from 3 to 10% of the amine promoter are preferred. The filler serves as a surface to achieve improved distribution of the promoter within the resin to be cured. It also provides an endothermic capability derived primarily from its ability to give up water of hydration and thereby moderate any exotherm should the amine be improperly added to a peroxide curing agent.

The water-bearing fillers, useful in the composition of the invention, may be generally described as those containing two to six waters of hydration. Of these, aluminum trihydrate, $CaSO_4.2H_2O$ and $M_gCO_3.3H_2O$ are illustrative of the compounds believed to be most advantageous. A suitable alumina is sold under the trade designation C-330 by Alcoa. Water soluble fillers are usually not desirable. In general, the water of hydration should be lost between about 100° C. and 300° C.

Among the organoamines which are most useful are those comprising aromatic rings such as, for example, phenyldiethanolamine (PDEA). Such an amine is most readily used when dissolved in a solvent such as dipropylene glycol or any other such solvent which is generally inert with respect to the peroxide and resin compounds in the system. PDEA is also advantageous because of its low vapor pressure, i.e. less than 0.01 mm of mercury at 20° C. In general, amines with vapor pressure of less than 1.0 mm of mercury at 20° C. are most advantageous for use in the invention.

A number of peroxide curing systems are known in the art as suitable for curing polyester resins. Benzoyl peroxide is particularly suitable at temperatures in the 30° F. to 45° F. range and is a preferred curing agent for use in the process of this invention. Methyl ethyl ketone peroxide may also be used. One particularly useful curing agent is the benzoyl peroxide-based product that is sold by the Lucidol Division of Pennwalt Corp. under the trade designation Luperco AFR. Benzoyl peroxide has given an excellent cure of polyester resins at low temperatures.

Other peroxides may be utilized. Among these are methyl ethyl ketone peroxide (MEKP) and 2, 4 pentanedione peroxide, available commercially from the Lucidol Division of Pennwalt Corp. under the tradename Lupersol 224. However, these latter two materials tend to yield cured polyester systems of inferior properties at temperatures below about 40° F. or 50° F.

The polyester resin systems to which this invention primarily relates are those which are typically formed by condensation reactions between polyol and polyacid reactants. The reactants contain double bonds which survive the condensation reaction and result in what may be termed unsaturated polyester prepolymers. Typically, the prepolymer is diluted somewhat and shipped in a diluent solvent such as styrene. This invention is primarily related to a means for subsequently curing the unsaturated prepolymer by cross-linking reactions involving the double bonds, a peroxide curing agent, and an amine promoter. Typical uses for such polyesters are as laminating resins and as putty resins. Typical resins are sold under the respective trade designation MR 12138 and MR 15207 by USS Chemical Co.

ILLUSTRATIVE EXAMPLES OF THE INVENTION

In this application, there is described a preferred embodiment of the invention and suggested various alternatives and modifications thereof, but it is to be understood that these are not intended to be exhaustive and that other changes and modifications can be made within the scope of the invention. The suggestions herein are selected and included for purposes of illustration in order that others skilled in the art will more fully understand the invention and the principles thereof and will be able to modify it and embody it in a variety of forms, each as may be best suited in the condition of a particular case.

EXAMPLE 1

A one quart sample of a polyester resin sold under the trade designation MR 12138 was used in this example.

A peroxide curing agent was prepared. It consisted of 43 cubic centimeters of the benzoyl peroxide product sold under the trade designation Luperco AFR.

An amine promoting composition was formed by dissolving 5 grams of PDEA with dipropylene glygol and intimately mixing the resulting solution with 48 grams of alumina (C-330sold by Alcoa).

All of the amine-promoting composition is thoroughly mixed with the polyester resin. Thereupon the peroxide is mixed with the resin and the resulting mixture is used as a laminating resin between layers of fiberglass cloth.

At a temperature of 40° F., an excellent cure is obtained within about 24 hours.

The shelf life of the amine-bearing resin (before the peroxide is added thereto) is in excess of four months at 65° F.

EXAMPLE 2

To demonstrate the safety of the system, 60.5 grams of amine-bearing alumina (no resin) comprised of 5.3 g. phenyldiethanolamine absorbed on 55.2 grams alumina trihydrate was mixed, in a polypropylene jar, with 46 grams of the benzoyl peroxide-based paste sold under the Trademark AFR by Lucidol. The resulting material increased rapidly in temperature after 5.5 minutes, reaching 320° F., then cooling to about 240° F. in ten minutes. Measurements were taken with a thermocouple buried in the mix. Only a small amount of vapor evolved, and the mix was somewhat charred. Nonetheless, it was clear that the system was not prone to the rapid heating and explosive decompositions of amine-peroxide interactions heretofore known. The polypropylene jar was not deformed during the procedure.

The above example represents the amount of material sufficient to cure approximately one quart of polyester resin.

It is also to be understood that the following claims are intended to cover all of the generic and specific features of the invention herein described and all statements of the scope of the invention which might be said to fall therebetween.

What is claimed as new and desired to be secured by Letters Patent of the United States is:

1. In a process for amine-promoting a peroxide cure of a polyester laminating resin composition, the improvement which comprises adding to said composition an effective quantity of amine promoter having a vapor pressure of less than 1 mm mercury at 20° C. while maintaining said amine promoter in intimate contact on a quantity of hydrated filler, said quantity of filler being from 7 to 50 times the weight of said amine promoter.

2. A process as defined in claim 1 wherein said hydrated filler molecule comprises at least two waters of hydration which water of hydration is thermally releasable at a temperature below about 300° C.

3. A process as defined in claim 2 wherein said hydrated filler is alumina trihydrate.

4. A process as defined in claim 1, 2 or 3 wherein said amine is an aromatic alkanolamine.

5. A process as defined in claim 1, 2 or 3 wherein said amine is phenyldiethanolamine.

6. A process as defined in claim 1, 2 or 3 wherein said peroxide is benzoyl peroxide.

7. A process as defined in claim 1, 2 or 3 wherein said process is carried out at a temperature between 25° F. and 50° F.

8. A process as defined in claim 1, 2 or 3 wherein said process is carried out at a temperature between 25° F. and 50° F., and wherein said amine is an aromatic alkanolamine and wherein said peroxide is benzoyl peroxide.

9. A process as defined in claim 1, 2 or 3 wherein said amine is phenyldiethanolamine and said peroxide is benzoyl peroxide.

10. As a composition of matter useful is promoting the cure of polyester resin, a quantity of water-insoluble hydrated powder of the type that will lose its water of hydration between 100° C. and 300° C. with, intimately distributed on said powder, an effective quantity of amine promoting agent.

11. A composition as defined in claim 10 wherein said powder in alumina trihydrate and said amine is an arylalkanol amine.

12. A composition as defined in claim 10 or 11 wherein said amine is phenyldiethanolamine.

13. A composition as defined in claim 10 wherein said amine promoting agent is present in a quantity of from 2–15% by weight and has a vapor pressure of less than 1 mm of mercury at 20° C.

14. A system useful in the low temperature, amine-promoted, peroxide cure of polyester resins said system consisting essentially of the following components:
  (1) A peroxide-curable polyester laminating resin composition
  (2) An effective quantity of peroxide-curing agent
  (3) An effective quantity of a amine promoter composition comprising amine which has a vapor pressure of less than 1 mm of mercury at 20° C. immobilized on the surface of a metal hydrate powder.

15. A system as defined in claim 14 wherein said amine is an aromatic amine and said metal hydrate is aluminum trihydrate.

16. A system as defined in claim 14 or 15 which is suitably cured, upon mixing of said components within 24 hours 40° F.

17. A composition as defined in claim 11 wherein said amine promoting agent is present in a quantity of from 2–15% by weight and has a vapor pressure of less than 1 mm of mercury at 20° C.

18. A composition as defined in claim 12 wherein said amine promoting agent is present in a quantity of from 2–15% by weight and has a vapor pressure of less than 1 mm of mercury at 20° C.

* * * * *